Nov. 13, 1962  G. FAURIE  3,063,735
BICYCLE CONSTRUCTION
Filed March 11, 1960  3 Sheets-Sheet 1

INVENTOR.
Georges Faurie.
BY
Harness, Dickey & Pierce.
ATTORNEYS

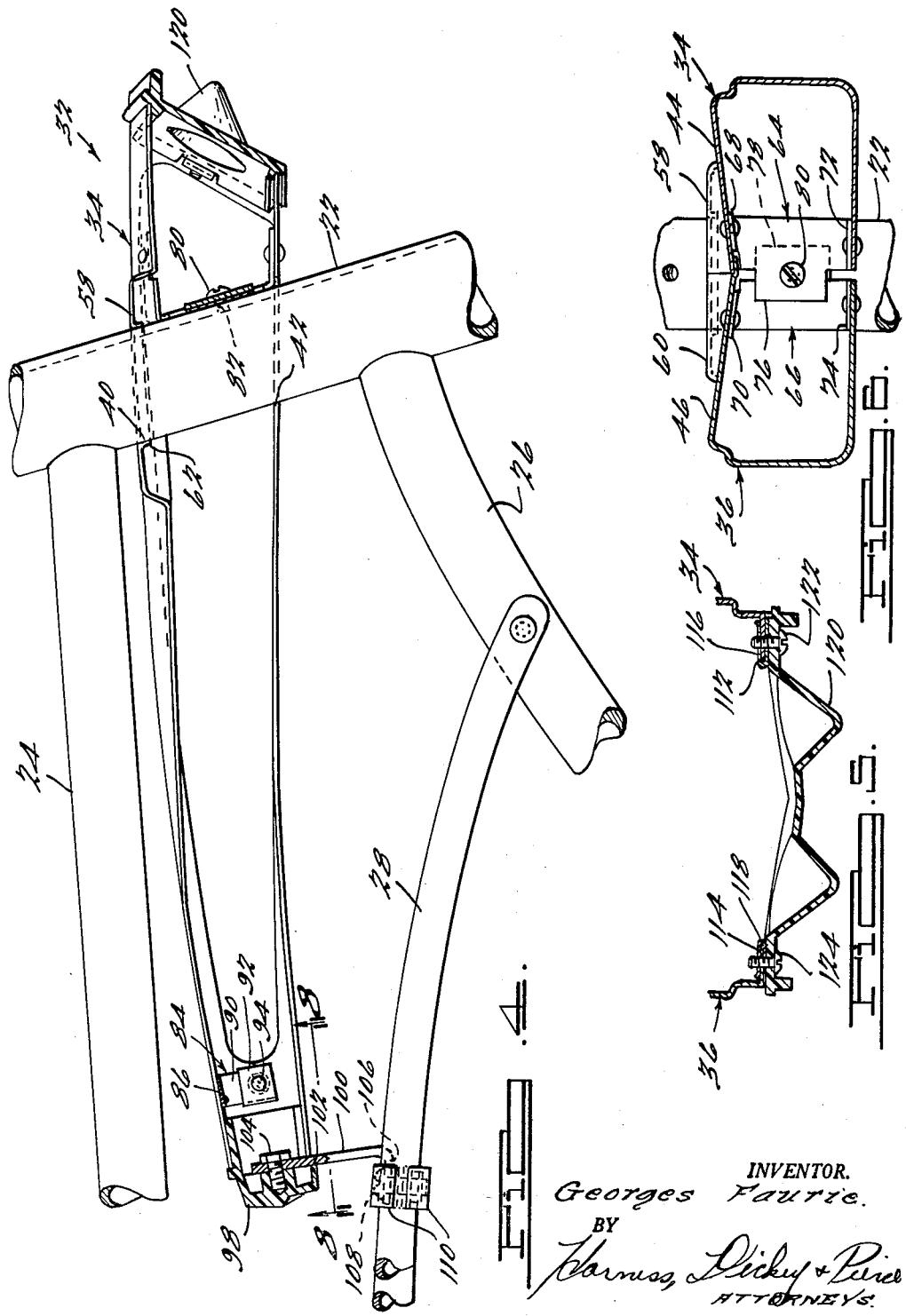

Nov. 13, 1962  G. FAURIE  3,063,735
BICYCLE CONSTRUCTION
Filed March 11, 1960  3 Sheets-Sheet 3
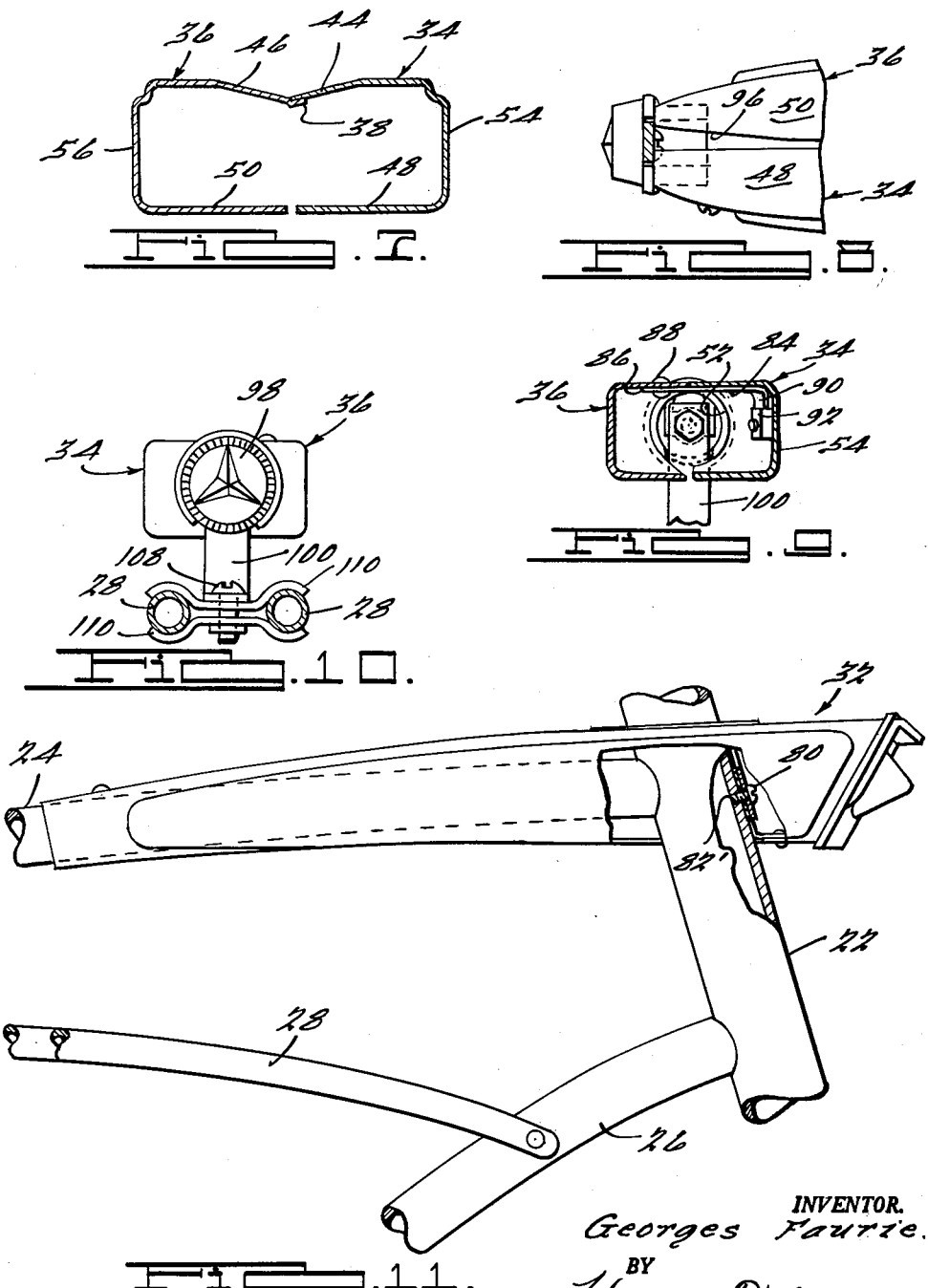
INVENTOR.
Georges Faurie.
BY
Barnes, Dickey & Pierce
ATTORNEYS

United States Patent Office 3,063,735
Patented Nov. 13, 1962

3,063,735
BICYCLE CONSTRUCTION
Georges Faurie, Livonia, Mich., assignor to Evans Products Company, Plymouth, Mich., a corporation of Delaware
Filed Mar. 11, 1960, Ser. No. 14,263
3 Claims. (Cl. 280—289)

The present invention relates to bicycles and the like, and more particularly to an improved construction for a bicycle or the like including an improved tank.

It is an object of the present invention to provide such an improved bicycle construction which is simple in design, economical of manufacture, easily assembled, and versatile and attractive in appearance.

It is also an object of the present invention to provide an improved tank construction for a bicycle or the like, which is adapted to be readily mounted on a bicycle in a plurality of different positions and thereby enable the attaining of different appearances with a minimum of expense.

Another object of the present invention is to provide an improved tank construction for a bicycle or the like having an improved mounting on the bicycle.

Other and more detailed objects of the invention will be apparent to those skilled in the art from a consideration of the following specification, the appended claims and the accompanying drawings wherein:

FIGURE 4 is a broken longitudinal sectional view on an enlarged scale of the structure of FIGURE 2, taken substantially along the line 4—4 thereof;

FIGURE 5 is a broken sectional view of the structure illustrated in FIGURE 3, taken substantially along the line 5—5 thereof;

FIGURE 6 is a broken sectional view of the structure illustrated in FIGURE 2, taken substantially along the line 6—6 thereof;

FIGURE 7 is a transverse sectional view of the structure illustrated in FIGURE 2, taken substantially along the line 7—7 thereof;

FIGURE 8 is a broken sectional view of the structure illustrated in FIGURE 4, taken substantially along the line 8—8 thereof;

FIGURE 9 is a transverse sectional view of the structure illustrated in FIGURE 2, taken substantially along the line 9—9 thereof;

FIGURE 10 is a rear elevational view looking in the direction of the arrows 10—10 in FIGURE 2; and FIGURE 11 is a broken side elevational view partly in section showing the tank mounted on the bicycle in a modified position and manner.

While it will be readily appreciated by those skilled in the art that the improvements of the present invention may be readily embodied in a wide variety of constructions, they are herein illustrated and described as embodied in a boy's bicycle.

Figure 1:
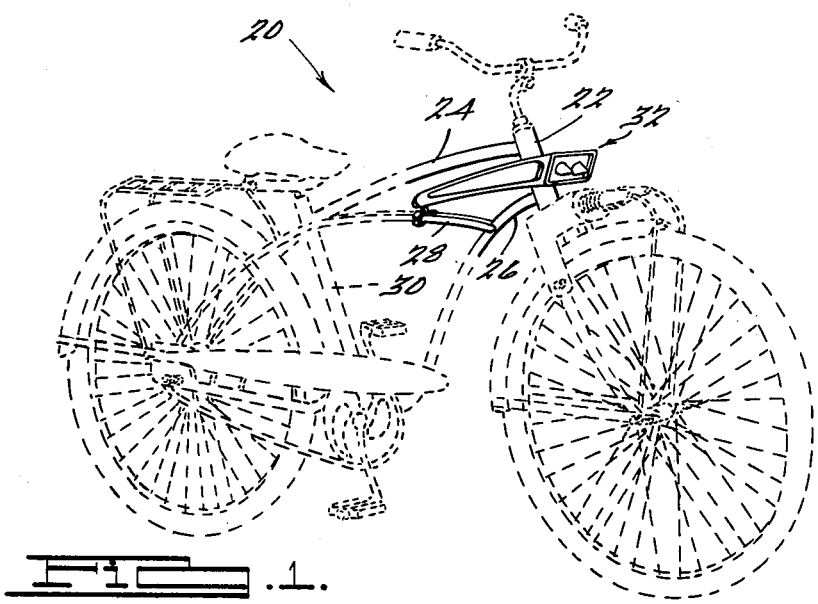
FIGURE 1 is a perspective view showing in full lines a fragmentary portion of a bicycle and a bicycle tank mounted thereon embodying the present invention.

Referring to the drawings, the bicycle 20 illustrated in FIGURE 1 includes a head post 22, an upper frame crossbar or tube 24, a lower frame tube 26 and intermediate tubes 28, the forward ends of which are connected to the lower frame tube 26 rearwardly of the head post 22 and which extend upwardly and rearwardly and are connected to the seat post 30 substantially at the point of connection of the rear end of the upper crossbar 24 to the seat post 30.

The tank generally indicated at 32 comprises a pair of tank halves 34 and 36 which are formed of sheet metal and provide a tank construction separating generally along the center line of the tank, as best illustrated in FIGURE 7. As will be seen in that figure, the tank half 36 has a flange 38 offset to extend below the adjacent edge of the upper wall of the tank half 34. These tank halves are formed to provide aligned openings 40 and 42, the upper opening 40 being defined by the upper walls 44 and 46 of the tank halves and the lower opening 42 being defined by the lower walls 48 and 50 of the tank halves. The rear, or left-hand portions, of the tank halves 34 and 36 define a generally circular opening 52 at the rear end of the tank and opening generally longitudinally thereof. This opening 52 is best seen in FIGURE 9. The tank halves 34 and 36 may be of any desired shape or contour to provide a desired appearance or to carry any desired equipment such, for example, as battery-operated lights. In the preferred embodiment illustrated the tank tapers from a maximum width at its front to a minimum at the rear and has generally flat sides 54 and 56 and the bottom walls 48 and 50 are flat in cross section as illustrated in FIGURE 7.

As best illustrated in FIGURES 1 and 4, the tank is slightly arcuate in shape as viewed in side elevation and from the front it curves gradually downwardly toward its rear or left-hand end. In the preferred embodiment illustrated, the upper walls 44 and 46 of the tank halves have upwardly offset semi-circular flange portions 58 and 60, respectively, the inner edges of which are inwardly turned as indicated at 62 in FIGURE 4, and co-operate to define the upper opening 40. The upper opening 40 is offset with respect to the lower opening 42 because of the angle of inclination of the head post 22 which extends through these openings. The tank halves 34 and 36 are provided with brackets 64 and 66 which have forwardly extending flanges 68 and 70, respectively, which are riveted to the upper walls 44 and 46 of the tank halves. These brackets are also provided with forwardly extending flanges 72 and 74 which are riveted to the bottom walls of the tank halves. These brackets have overlying attaching flanges 76 and 78, respectively, which are provided with aligned apertures receiving a screw 80 extending therethrough and into a tapped opening 82 provided in the head post 22. This screw 80 co-operates with the brackets 64 and 66 to both hold the forward ends of the tank halves 34 and 36 together and to secure the tank to and support it on the head post 22.

Figure 2:
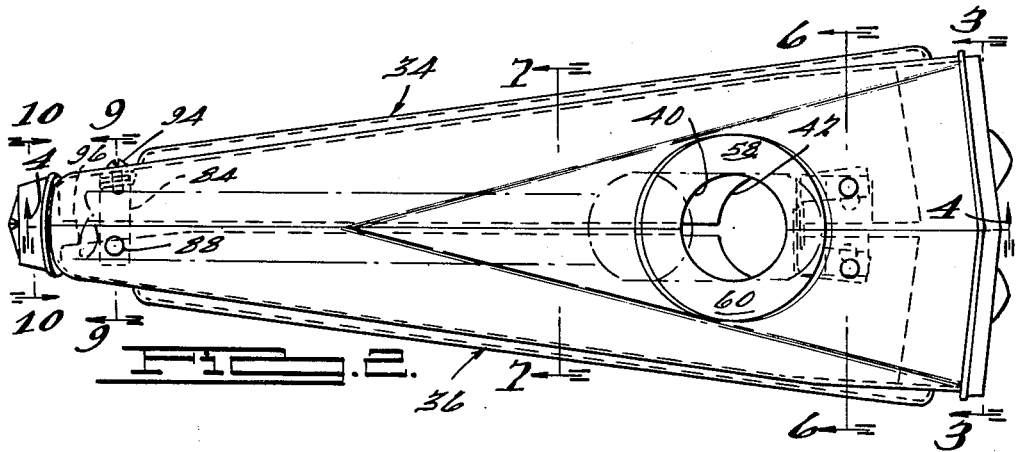
FIGURE 2 is a plan view on an enlarged scale of the tank illustrated in FIGURE 1, showing parts of the bicycle in broken lines.
Figure 3:
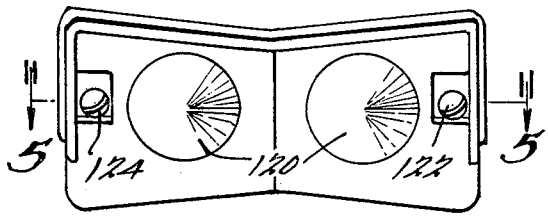
FIGURE 3 is a front view in the direction of the arrows 3—3 of FIGURE 2.

In the preferred embodiment the tank halves 34 and 36 are held together adjacent their rear ends by an angle bracket 84 having a horizontal leg 86 which is riveted to the upper wall 46 of the tank half 36 as indicated at 88 in FIGURE 9 and which has a downwardly extending leg 90 which carries a sheet metal nut 92. The horizontal leg 86 of the angle bracket 84 extends in underlying relationship with the upper walls 44 and 46 of the tank halves and extends downwardly along the side surfaces 54 of the tank half 34 at the inner side thereof. A screw 94 extends inwardly through the side wall 54 and engages the sheet metal nut 92. The bottom 50 of the tank half 36 is cut away as indicated at 96. This is shown in full lines in FIGURE 8 and is shown in dotted lines in FIGURE 2. This relief is to facilitate assembly when the tank is mounted in the position shown in FIGURE 11, the spacing between this edge 96 and the depending flange 90 carrying the sheet metal nut 92 being sufficient to permit the crossbar tube 24 to be moved between the depending flange 90 and the edge 96.

In the tank mounting illustrated in FIGURES 1 to 10, inclusive, an ornamental plug 98 is mounted in the opening 52 at the rear end of the tank. A supporting bracket 100 extends upwardly into the plug 98 through a slot 102 provided in the bottom thereof and receives a screw 104 threaded into a tapped opening provided axially of the plug. The lower end of the bracket 100 has a rearwardly turned flange 106 which is secured by a screw 108 to a pair of clamp plates 110 fitted on opposite sides of the intermediate tubes 28 of the bicycle frame, as best illustrated in FIGURE 10.

At the front end of the tank 32 the tank halves 34 and 36 are provided with inwardly turned flanges 112 and 114 which carry sheet metal nuts 116 and 118. A lens cover 120 covers the opening at the front end of the tank and is connected to the tank halves 34 and 36 by screws 122 and 124 extending through the lens cover and engaging the sheet metal nuts 116 and 118.

When it is desired to mount the tank 32 in the position illustrated in FIGURE 11, which it will be noted is above the position illustrated in FIGURES 1 to 10, inclusive, a threaded aperture 82' is provided in the head post at the position in which it is desired to secure the forward end of the tank 32. In the position illustrated, the tank fits over the connection of the crossbar tube 24 at its forward end to the head post 22 and the crossbar tube 24 extends outwardly from the tank 32 through the opening 52 at the rear end thereof. When the tank is mounted in this position it will thus be seen that the plug 98 and supporting bracket 100 and clamps 110 employed in the mounting illustrated in FIGURES 1 to 10, inclusive, are not required, the rear end of the tank being supported directly by the upper tube 24 extending outwardly through the rear end thereof.

While only one specific embodiment of the invention has been illustrated and described herein, it will be readily appreciated by those skilled in the art that numerous modifications and changes can be made without departing from the spirit of the present invention.

What is claimed is:

1. In a bicycle construction, a headpost, tank comprising a pair of generally similar tank elements fitting together and cooperating to receive said headpost transversely therethrough, and means simultaneously securing said tank elements together and securing said tank to said headpost against movement therealong, said means including co-operating brackets carried by said tank elements and having aligned openings therein and fastener means extending through said openings and into said headpost.

2. In a bicycle construction, a headpost, a frame bar connected to said headpost, a bicycle tank encircling said headpost and receiving said headpost transversely therethrough in spaced relation to one end of said tank, means at said one end of said tank supporting said one end of said tank on said frame bar in spaced relation to said headpost, said last named means including means on said tank defining an opening opening longitudinally of said tank at said one end, a plug in said last named opening, and means connecting said plug to said bar.

3. A tank for a bicycle or the like comprising a pair of generally similar tank elements fitting together and co-operating to define openings opening generally transversely thereof for receiving a bicycle headpost therethrough, said tank elements cooperating to define another opening disposed at one end of said tank and in spaced relation to said openings and opening generally longitudinally of said tank, and means for securing said tank elements together for said co-operation, said means including an angle bracket adjacent said one end of said tank and disposed out of alignment with said another opening, said bracket being mounted on one of said tank elements and having one end disposed adjacent the other of said tank elements and carrying fastener means thereon connecting the bracket to said other tank element.

References Cited in the file of this patent

UNITED STATES PATENTS

| D. 112,069 | Huffman et al. | Nov. 8, 1938 |
| D. 125,308 | Huffman | Feb. 18, 1941 |
| 2,011,016 | Schwinn | Aug. 13, 1935 |
| 2,051,823 | Clarke | Aug. 25, 1936 |
| 2,755,095 | Douglas et al. | July 17, 1956 |
| 2,755,103 | Douglas | July 17, 1956 |
| 2,944,833 | Wintermantel et al. | July 12, 1960 |

FOREIGN PATENTS

| 399,005 | Great Britain | Sept. 28, 1933 |

OTHER REFERENCES

American Bicyclist and Motorcyclist Magazine, March 1959, page 20.